United States Patent
Biswas et al.

(10) Patent No.: US 7,174,383 B1
(45) Date of Patent: Feb. 6, 2007

(54) METHOD AND APPARATUS TO FACILITATE SINGLE SIGN-ON SERVICES IN A HOSTING ENVIRONMENT

(75) Inventors: Kamalendu Biswas, Hayward, CA (US); Arun Swaminathan, San Carlos, CA (US); Gaurav Bhatia, Foster City, CA (US)

(73) Assignee: Oracle International Corp., Redwood Shores, CA (US)

( * ) Notice: Subject to any disclaimer, the term of this patent is extended or adjusted under 35 U.S.C. 154(b) by 821 days.

(21) Appl. No.: 10/160,524

(22) Filed: Jun. 3, 2002

Related U.S. Application Data

(60) Provisional application No. 60/316,808, filed on Aug. 31, 2001.

(51) Int. Cl.
 *G06F 15/16* (2006.01)
(52) U.S. Cl. ..................................... 709/229
(58) Field of Classification Search ................ None
 See application file for complete search history.

(56) References Cited

U.S. PATENT DOCUMENTS

| | | | | |
|---|---|---|---|---|
| 5,682,478 A * | 10/1997 | Watson et al. | ............... | 709/229 |
| 5,805,803 A * | 9/1998 | Birrell et al. | ................. | 726/12 |
| 5,812,784 A * | 9/1998 | Watson et al. | .............. | 709/227 |
| 6,226,752 B1 * | 5/2001 | Gupta et al. | .................... | 726/9 |
| 6,668,322 B1 * | 12/2003 | Wood et al. | ................. | 713/182 |
| 6,691,232 B1 * | 2/2004 | Wood et al. | .................... | 726/6 |
| 6,763,468 B2 * | 7/2004 | Gupta et al. | .................... | 726/2 |
| 6,865,605 B1 * | 3/2005 | Soderberg et al. | .......... | 709/226 |
| 6,892,307 B1 * | 5/2005 | Wood et al. | .................... | 726/8 |
| 2003/0005118 A1 * | 1/2003 | Williams | .................... | 709/225 |

* cited by examiner

*Primary Examiner*—Jason Cardone
*Assistant Examiner*—Thomas Duong
(74) *Attorney, Agent, or Firm*—Park, Vaughan & Fleming, LLP; Edward J. Grundler

(57) ABSTRACT

One embodiment of the present invention provides a system that facilitates single sign-on services in a hosting environment. The system operates by first receiving a request from a user to access a partner application at an application server. The system then determines if the user holds a token granting access to this partner application. If the user does not hold this token, the system redirects the request to a single sign-on server. This single sign-on server requests a user authentication credential from the user. Upon receiving the user authentication credential, including an entity identifier, the single sign-on server verifies if the user is authorized to access the partner application based on the entity identifier. If the user is authorized to access the partner application, the single sign-on server issues a token to the user, which grants the user access to the partner application.

24 Claims, 5 Drawing Sheets

METHOD AND APPARATUS TO FACILITATE SINGLE SIGN-ON SERVICES IN A HOSTING ENVIRONMENT

RELATED APPLICATION

This application hereby claims priority under 35 U.S.C. §119 to a Provisional Patent Application entitled, "Security Mechanisms in a Network Environment," filed Aug. 31, 2001 by inventors Arun Swaminathan, Kamalendu Biswas, and Gaurav Bhatia (Application No. 60/316,808).

BACKGROUND

1. Field of the Invention

The present invention relates to web-hosted computer applications. More specifically, the present invention relates to a method and an apparatus to facilitate single sign-on services for web-hosted applications.

2. Related Art

As use of the Internet continues to grow at an exponential rate, the number of entities subscribing to web-hosted applications has grown dramatically. Access to these web-hosted applications is typically controlled by an entity, such as a hosting company, as directed by a client company.

One method of controlling access to web-hosted applications is by using separate computers for each entity, wherein each computer includes an access list for the applications hosted on that computer. This method has several drawbacks. For example, this method wastes available computing resources and fails to present an integrated interface to the user. Using separate computers is, therefore, not cost effective. Also, providing separate computers for each entity does not facilitate sharing computational resources to provide differing levels of quality of service (QOS) to different entities. In order to provide these differing levels, the provider of web-hosted applications presently has to maintain multiple computer configurations.

Administering multiple systems is also difficult when new applications are added. The administrator typically installs the application on each computer and then makes needed changes in the access lists on each computer so that the users can access the application.

Each application typically controls access to its services using an authentication scheme such as user-name and password. While these authentication schemes provide protection against unauthorized access to the application, they can also cause frustration. When the user switches to a related application, the related application typically requests authentication credentials even though the user had access to the first application. Switching applications may also invalidate the authentication for the first application and may require re-authentication when the user returns to the first application.

What is needed is a method and an apparatus to facilitate access to web-hosted applications that do not exhibit the problems listed above.

SUMMARY

One embodiment of the present invention provides a system that facilitates single sign-on services in a hosting environment. The system operates by first receiving a request from a user to access a partner application at an application server. The system then determines if the user holds a token granting access to this partner application. If the user does not hold this token, the system redirects the request to a single sign-on server. This single sign-on server requests a user authentication credential from the user. Upon receiving the user authentication credential, including an entity identifier, the single sign-on server verifies if the user is authorized to access the partner application based on the entity identifier. If the user is authorized to access the partner application, the single sign-on server issues a token to the user, which grants the user access to the partner application.

In one embodiment of the present invention, the partner application is one of multiple partner applications, and the token can grant access to the multiple partner applications.

In one embodiment of the present invention, the system allows an administrator to establish the plurality of partner applications.

In one embodiment of the present invention, the administrator establishes the plurality of partner applications based on the entity identifier.

In one embodiment of the present invention, the system stores data related to the plurality of partner applications in a virtual private database. This virtual private database is established based on the entity identifier.

In one embodiment of the present invention, the entity identifier includes a company identifier.

In one embodiment of the present invention, the token issued to the user is encrypted to protect the token from tampering.

In one embodiment of the present invention, the user authentication credential is encrypted during transit on a network.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 1:
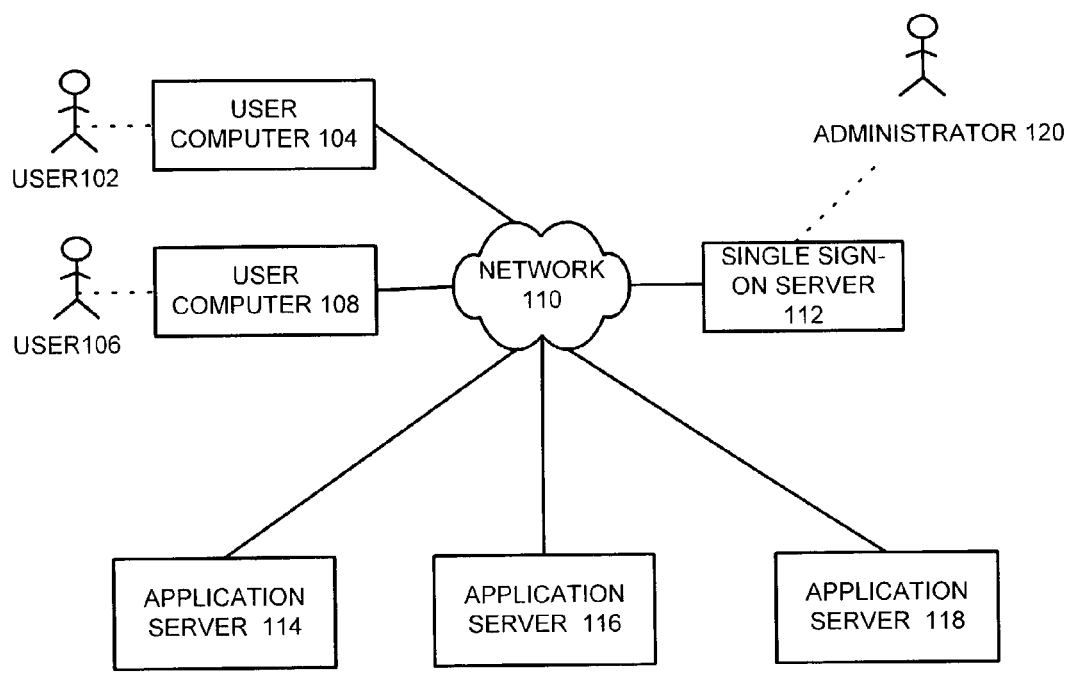
FIG. 1 illustrates computers coupled together in accordance with an embodiment of the present invention.

FIG. 1 illustrates computers coupled together in accordance with an embodiment of the present invention. User computers 104 and 108, single sign-on server 112, and application servers 114, 116, and 118 are coupled together by network 110. User computers 104 and 108, single sign-on server 112, and application servers 114, 116, and 118 can generally include any type of computer system, including, but not limited to, a computer system based on a microprocessor, a mainframe computer, a digital signal processor, a portable computing device, a personal organizer, a device controller, and a computational engine within an appliance.

Network 10 can generally include any type of wire or wireless communication channel capable of coupling together computing nodes. This includes, but is not limited to, a local area network, a wide area network, or a combination of networks. In one embodiment of the present invention, network 110 includes the Internet.

Users 102 and 106 access web-hosted applications with user computers 104 and 108 respectively. User computers 104 and 108 may be provided to users 102 and 106 by different entities. For example their respective employers may provide user computers 104 and 108 to users 102 and 106.

Application servers 114, 116, and 118 provide partner applications to users 102 and 106. The employers buy the services of the partner applications from a service provider. Since users 102 and 106 may belong to different entities, each user may have access to a different set of applications. Note that the applications may be hosted on a single application server or may be on multiple applications servers as shown in FIG. 1. Note also that single sign-on server 112 may be hosted in the same computer as the partner applications. The service provider may control access to application servers 114, 116, and 118 by limiting the allowed bandwidth for a specified entity. In this manner, the service provider may sell quality-of-service (QOS) as well as the services themselves.

The partner applications are programmed to provide access to users based on a token received from the user. The token is provided by single sign-on server 112 and includes the authorized applications for the user, the QOS level to be provided to the user, and an expiry time for the token. Data provided within the token is derived from a virtual private database as described below in conjunction with FIG. 3. This token is encrypted to protect the token from tampering.

Administrator 120 establishes the data within the virtual private database as described below in conjunction with FIG. 4. Typically, administrator 120 operates on behalf of the service provider.

In operation, a user, for example user 102, requests access to an application on an application server, for example application server 116. This application, in turn, determines if the user has a current token allowing access to the application. If so, the expiry time within the token is updated to allow continuing access to the partner applications and access is granted to the application.

If the time is later than the expiry time within the token or if the token does not exist, the application redirects the request to single sign-on server 112. Single sign-on server 112 then requests authentication credentials from user 102. These authentication credentials may include user-name and password and includes an entity identifier, which identifies the entity or company associated with user 102. Note that this entity identifier can include a company name or other unique identifier for controlling access to the allowed applications for the entity. Next, Single sign-on server 112 determines if user 102 is authorized to access the application as described below in conjunction with FIGS. 3, 5, and 6 below. If user 102 is authorized to access the application, single sign-on server 112 issues a token to user 102 specifying the authorized applications and including an expiry time based on a predetermined period specified by the user's company. This token is encrypted and then provided to user 102. Control is then redirected to the application where access is granted to the application.

User Computer 104

Figure 2:
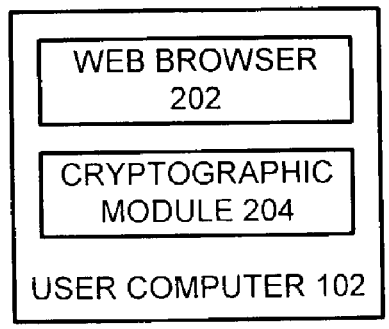
FIG. 2 illustrates user computer 104 in accordance with an embodiment of the present invention.

FIG. 2 illustrates user computer 104 in accordance with an embodiment of the present invention. User computer 104 typifies user computers coupled to the system including user computer 108. Therefore, only user computer 104 will be described herein. User computer 104 includes web browser 202 and cryptographic module 204.

User 102 accesses partner applications from application servers 114, 116, and 118 using web browser 202. Web browser 202 can generally include any type of web browser capable of viewing a web site. Cryptographic module 204 can be used to encrypt user authentication credentials while these credentials are in transit across network 110. These authentication credentials include an entity identifier to allow single sign-on server 112 to access the proper virtual private database as described below in conjunction with FIG. 3.

Single Sign-On Server 112

Figure 3:
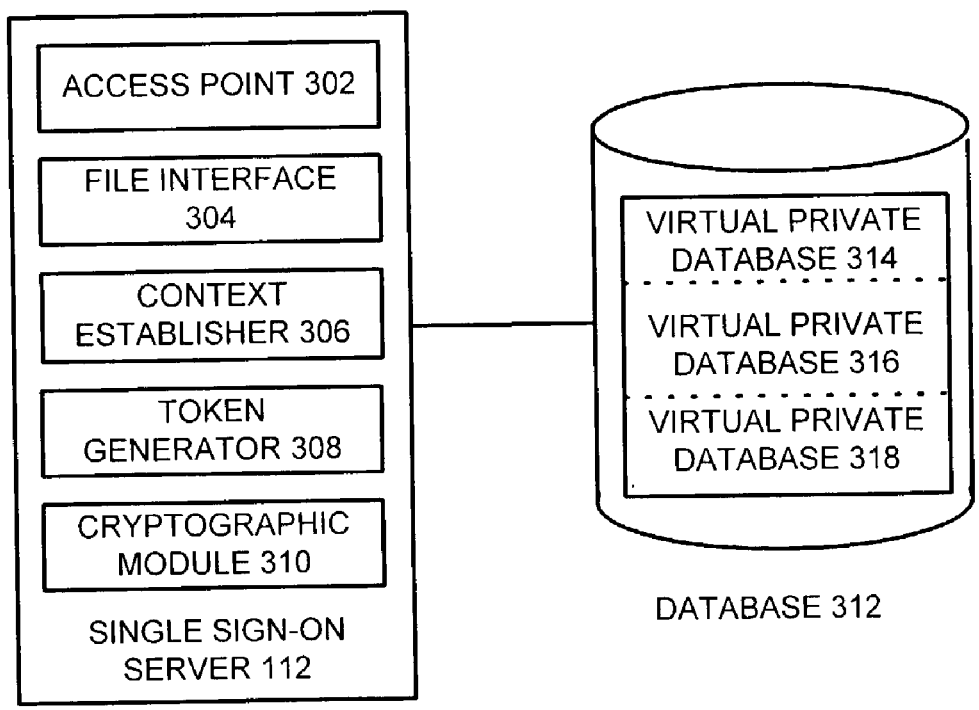
FIG. 3 illustrates single sign-on server 112 in accordance with an embodiment of the present invention.

FIG. 3 illustrates single sign-on server 112 in accordance with an embodiment of the present invention. Single sign-on server 112 includes access point 302, file interface 304, context establisher 306, token generator 308, and cryptographic module 310. Additionally, single sign-on server 112 is coupled to database 312 to provide persistent data storage and retrieval.

Access point 302 is the access point to single sign-on server 112 and provides an interface to a user, for example user 102. Access point 302 provides a launch pad for the various applications allowed to the user. When an access request from user 102 is redirected to access point 302, access point 302 requests authentication credentials, including an entity identifier, from user 102. Typically, these authentication credentials are encrypted to provide protection during transit across network 110. Cryptographic module 310 decrypts these authentication credentials and provides the credentials to access point 302. Next, access point 302 determines the entity identifier by examining the authentication credentials.

Context establisher 306 uses the entity identifier to set the context of the system to the entity or company associated with user 102. Next, file interface 304 requests authorization data from database 312. More specifically, file interface 304 requests authorization data from the virtual private database associated with the context that was set using the entity identifier, for example virtual private database 318. Virtual private database (VPD) is a feature of Oracle® RDBMS. Oracle® is a registered trademark of Oracle Corporation, Redwood Shores, Calif.

If user 102 is authorized to access the application, token generator 308 creates a token, which provides access to the authorized partner applications for user 102. This token includes an expiry time based on data supplied from virtual private database 318. Next, cryptographic module 310 encrypts the token and then access point 302 sends the encrypted token to user 102. User 102 is then redirected to the application server providing the requested partner application.

Database 312 includes virtual private databases 314, 316, and 318. Database 312 can include any type of system for storing data in non-volatile storage. This includes, but is not limited to, systems based upon magnetic, optical, and magneto-optical storage devices, as well as storage devices based on flash memory and/or battery-backed up memory.

Database 312 is striped to provide a virtual private database for each subscribing entity. A virtual private database, for example virtual private database 314, includes authorization data for a specified entity. For example, virtual private database 314 can include a list of users and passwords associated with the specified entity; rules regarding password length, construction and expiration; and timeout periods for establishing expiry times of tokens.

Establishing a Virtual Private Database

Figure 4:
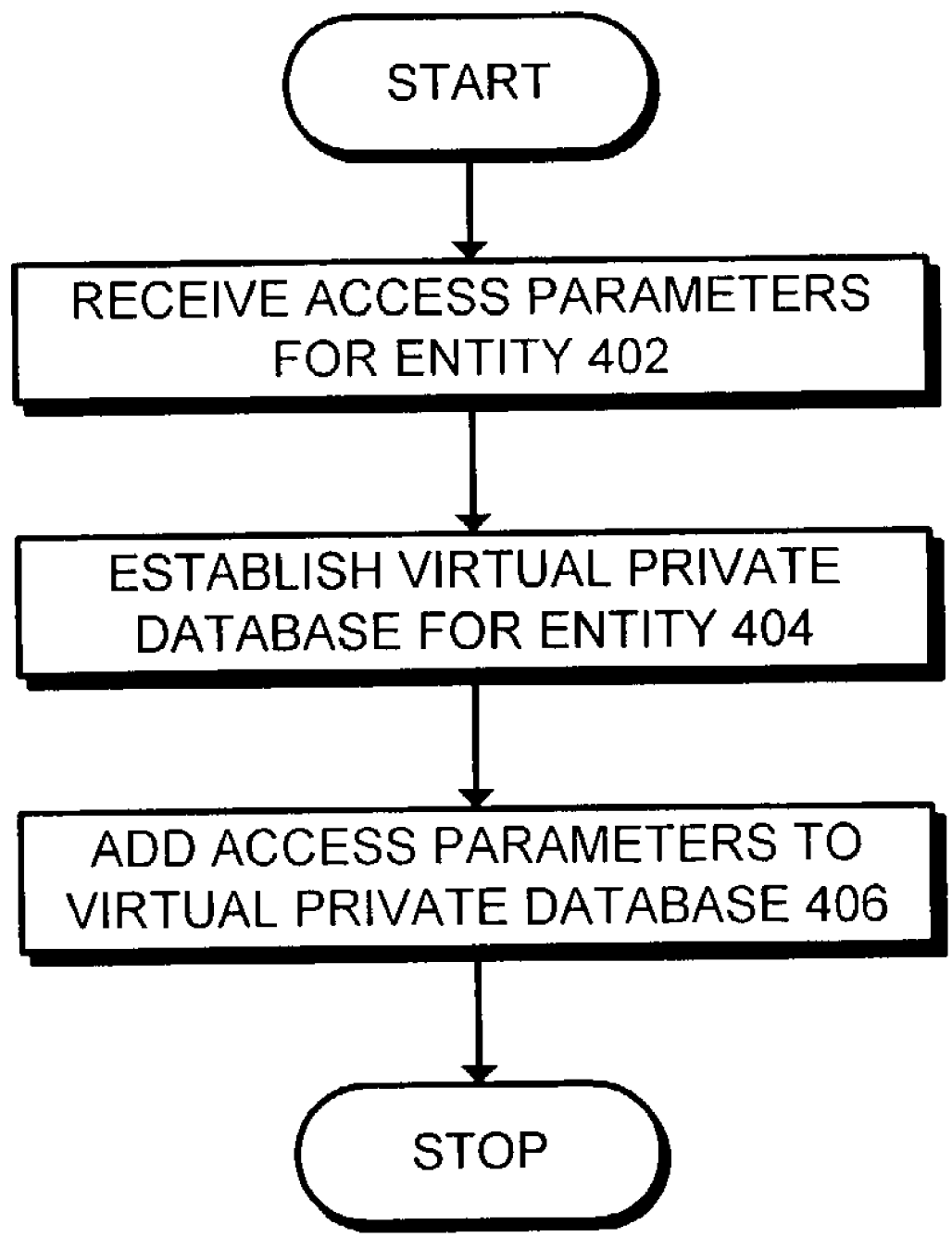
FIG. 4 is a flowchart illustrating the process of an administrator creating a virtual private database entry for an entity in accordance with an embodiment of the present invention.

FIG. 4 is a flowchart illustrating the process of an administrator creating a virtual private database entry for an entity in accordance with an embodiment of the present invention. The system starts when administrator 120 receives access parameters and rules for an entity (step 402). Next, administrator 120 establishes a new stripe for a virtual private database within database 312 (step 404). Finally, administrator 120 adds the access parameters and rules to the new private virtual database (step 406).

Granting User Access

Figure 5:
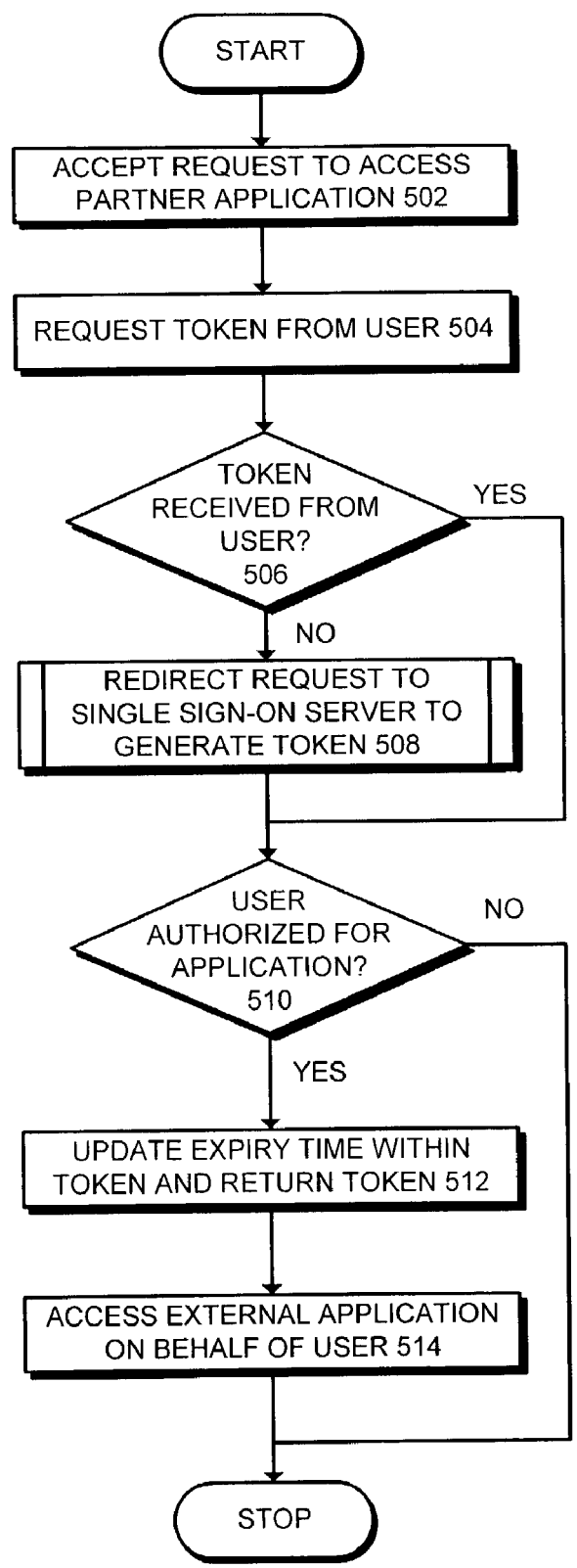
FIG. 5 is a flowchart illustrating the process of granting a user access to a partner application in accordance with an embodiment of the present invention.

FIG. 5 is a flowchart illustrating the process of granting a user access to a partner application in accordance with an embodiment of the present invention. The system starts when a partner application accepts a request from a user, for example user 102, to access the partner application located on an application server, for example application server 116 (step 502). Next, single sign-on server 112 requests a token from user 102 (step 504). This token, if it exists, was previously set by single sign-on server 112 as described below. The partner application then determines if a valid, non-expired token was received from user 102 (step 506). If no valid, non-expired token is received, the application redirects the access to request single sign-on server 112 to create a valid, non-expired token (step 508). This process is described in detail in conjunction with FIG. 6 below.

After ensuring that a valid token was received at step 506 or after receiving a new token at step 508, the application determines if access to the application is authorized (step 510). If so, the application updates the expiry time in the token and returns the token to the user (step 512). Finally, the application allows access on behalf of the user (step 514). If the user is not authorized to access the application at step 510, the process is terminated.

Generating an Access Token

Figure 6:
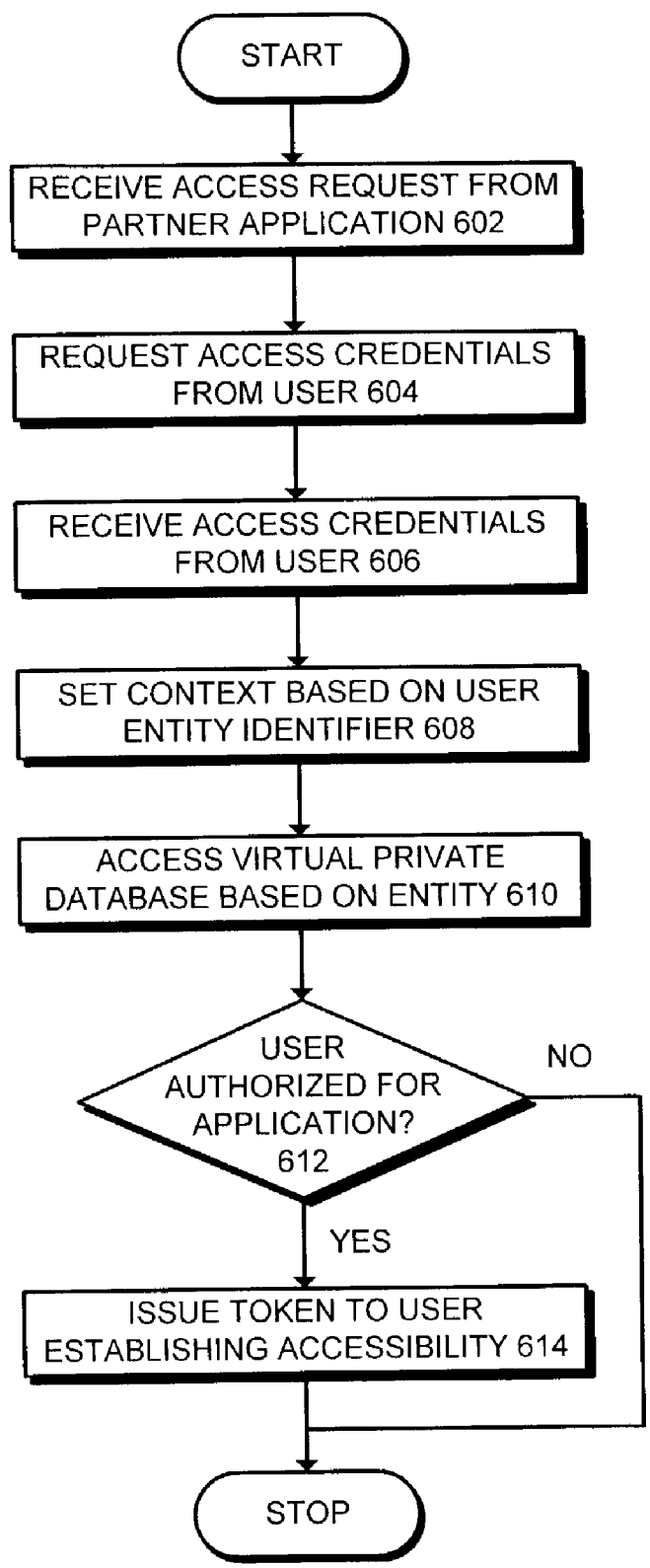
FIG. 6 is a flowchart illustrating the sub-process of generating an access token for a user in accordance with an embodiment of the present invention.

FIG. 6 is a flowchart illustrating the sub-process of generating an access token for a user in accordance with an embodiment of the present invention. The system starts when single sign-on server 112 receives a redirected access request from a partner application (step 602). Next, single sign-on server 112 requests access authentication credentials, including an entity identifier, from the user, for example user 102 (step 604). Single sign-on server 112 then receives the access credentials from user 102 (step 606).

Upon receiving access credentials from user 102, single sign-on server 112 sets the context based on the entity identifier from user 102 (step 608). Setting the context provides access to the virtual private database associated with the entity identifier, for example virtual private database 314. Next, single sign-on server 112 accesses virtual private database 314 to receive a listing of which partner applications user 102 is authorized to access (step 610). Note that the data received from virtual private database 314 can include other data, for example password expiration dates and parameters defining an acceptable password.

Next, single sign-on server 112 determines if user 102 is authorized to access the requested application (step 612). If so, single sign-on server 112 issues a token to user 102 granting access to the partner application (step 614). Otherwise, the user is denied access to the partner application.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate single sign-on services in a hosting environment, comprising:
   receiving a request from a user to access a partner application at an application server, wherein the application server is a hosting server supplying application services to multiple entities;
   determining if the user holds a token granting access to the partner application; and
   if the user does not hold the token,
     redirecting the request to a single sign-on server,
     requesting a user authentication credential from the user,
     receiving the user authentication credential, wherein the user authentication credential includes an entity identifier which identifies a requesting entity associated with the user to the hosting server,
     verifying if the user is authorized to access the partner application based on the entity identifier, and
     if the user is authorized to access the partner application, issuing the token to the user, wherein the token grants access to the partner application to the user, and wherein the token includes an expiry time based on data supplied from a virtual private database, wherein the virtual private database is in non-volatile storage.

2. The method of claim 1,
   wherein the partner application includes one of a plurality of partner applications; and
   wherein the token can grant access to another application of the plurality of partner applications.

3. The method of claim 2, further comprising allowing an administrator to establish the plurality of partner applications.

4. The method of claim 3, wherein the administrator establishes the plurality of partner applications based on the entity identifier.

5. The method of claim 4, further comprising storing data related to the plurality of partner applications in the virtual private database, wherein the virtual private database is established based on the entity identifier.

6. The method of claim 1, wherein the entity identifier includes a company identifier.

7. The method of claim 1, further comprising encrypting the token issued to the user to protect the token from tampering.

8. The method of claim 1, further comprising encrypting the user authentication credential during transit on a network.

9. A computer-readable storage device storing instructions that when executed by a computer cause the computer to perform a method to facilitate single sign-on services in a hosting environment, the method comprising:
- receiving a request from a user to access a partner application at an application server, wherein the application server is a hosting server supplying application services to multiple entities;
- determining if the user holds a token granting access to the partner application; and
- if the user does not hold the token,
  - redirecting the request to a single sign-on server,
  - requesting a user authentication credential from the user,
  - receiving the user authentication credential, wherein the user authentication credential includes an entity identifier which identifies a requesting entity associated with the user to the hosting server,
  - verifying if the user is authorized to access the partner application based on the entity identifier, and
  - if the user is authorized to access the partner application, issuing the token to the user, wherein the token grants access to the partner application to the user, and wherein the token includes an expiry time based on data supplied from a virtual private database, wherein the virtual private database is in non-volatile storage.

10. A computer-readable storage device of claim 9, wherein the partner application includes one of a plurality of partner applications; and wherein the token can grant access to another application of the plurality of partner applications.

11. A computer-readable storage device of claim 10, the method further comprising allowing an administrator to establish the plurality of partner applications.

12. A computer-readable storage device of claim 11, wherein the administrator establishes the plurality of partner applications based on the entity identifier.

13. A computer-readable storage device of claim 12, the method further comprising storing data related to the plurality of partner applications in the virtual private database, wherein the virtual private database is established based on the entity identifier.

14. A computer-readable storage device of claim 9, wherein the entity identifier includes a company identifier.

15. A computer-readable storage device of claim 9, the method further comprising encrypting the token issued to the user to protect the token from tampering.

16. A computer-readable storage device of claim 9, the method further comprising encrypting the user authentication credential during transit on a network.

17. An apparatus to facilitate single sign-on services in a hosting environment, comprising:
- a first receiving mechanism that is configured to receive a request from a user to access a partner application at an application server, wherein the application server is a hosting server supplying application services to multiple entities;
- a determining mechanism that is configured to determine if the user holds a token granting access to the partner application;
- a redirecting mechanism that is configured to redirect the request to a single sign-on server;
- a requesting mechanism that is configured to request a user authentication credential from the user;
- a second receiving mechanism that is configured to receive the user authentication credential, wherein the user authentication credential includes an entity identifier which identifies a requesting entity associated with the user to the hosting server;
- a verifying mechanism that is configured to verify if the user is authorized to access the partner application based on the entity identifier; and
- an issuing mechanism that is configured to issue the token to the user, wherein the token grants access to the partner application to the user, and wherein the token includes an expiry time based on data supplied from a virtual private database, wherein the virtual private database is in non-volatile storage.

18. The apparatus of claim 17,
- wherein the partner application includes one of a plurality of partner applications; and
- wherein the token can grant access to another application of the plurality of partner applications.

19. The apparatus of claim 18, further comprising an access mechanism that is configured to allow an administrator to establish the plurality of partner applications.

20. The apparatus of claim 19, wherein the administrator establishes the plurality of partner applications based on the entity identifier.

21. The apparatus of claim 20, further comprising a storing mechanism that is configured to store data related to the plurality of partner applications in the virtual private database, wherein the virtual private database is established based on the entity identifier.

22. The apparatus of claim 17, wherein the entity identifier includes a company identifier.

23. The apparatus of claim 17, further comprising an encrypting mechanism that is configured to encrypt the token issued to the user to protect the token from tampering.

24. The apparatus of claim 17, further comprising an encrypting mechanism that is configured to encrypt the user authentication credential during transit on a network.

* * * * *